United States Patent
Bizub et al.

(10) Patent No.: US 9,897,021 B2
(45) Date of Patent: Feb. 20, 2018

(54) SYSTEM AND METHOD FOR DETERMINING LOCATION AND VALUE OF PEAK FIRING PRESSURE

(71) Applicant: General Electric Company, Schenectady, NY (US)

(72) Inventors: Jeffrey Jacob Bizub, Milwaukee, WI (US); Dhruval Bhatt, Houston, TX (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 186 days.

(21) Appl. No.: 14/820,156

(22) Filed: Aug. 6, 2015

(65) Prior Publication Data

US 2017/0037798 A1 Feb. 9, 2017

(51) Int. Cl.
*F02B 47/08* (2006.01)
*F02D 41/00* (2006.01)
(Continued)

(52) U.S. Cl.
CPC ....... *F02D 41/0052* (2013.01); *F02D 35/024* (2013.01); *F02D 35/028* (2013.01);
(Continued)

(58) Field of Classification Search
CPC ............... F02D 35/027; F02D 41/0052; F02D 41/0072; F02D 41/0077; F02D 41/009; F02M 26/45; F02M 26/47; F02M 26/49
(Continued)

(56) References Cited

U.S. PATENT DOCUMENTS 4,315,492 A 2/1982 Gardner
4,762,109 A * 8/1988 Jeenicke ............. F02D 41/0072
123/478

(Continued)

FOREIGN PATENT DOCUMENTS

CN 203480037 3/2014
EP 1447654 8/2004
(Continued)

OTHER PUBLICATIONS

U.S. Appl. No. 14/918,013, filed Oct. 20, 2015, Venkatesh Raman.
(Continued)

*Primary Examiner* — Marguerite McMahon
*Assistant Examiner* — Tea Holbrook
(74) *Attorney, Agent, or Firm* — Fletcher Yoder, P.C.

(57) ABSTRACT

A system includes a combustion engine having an intake manifold and an exhaust manifold, an exhaust gas recirculation (EGR) system coupled to the combustion engine and configured to route exhaust generated by the combustion engine from the exhaust manifold to the intake manifold, and a first knock sensor coupled to the combustion engine and configured to measure vibrations of the combustion engine and output a first vibration signal. The system also includes a controller communicatively coupled to the combustion engine, the knock sensor, the EGR system, or any combination thereof. The controller is configured to determine a peak firing pressure (PFP) within the combustion engine and control operations of both the combustion engine and the EGR system based on the PFP.

17 Claims, 4 Drawing Sheets

(51) Int. Cl.
  *F02M 26/45* (2016.01)
  *F02M 26/49* (2016.01)
  *F02M 26/47* (2016.01)
  *F02D 35/02* (2006.01)

(52) U.S. Cl.
  CPC ......... *F02D 41/0072* (2013.01); *F02M 26/45* (2016.02); *F02M 26/47* (2016.02); *F02M 26/49* (2016.02); *F02D 35/027* (2013.01); *Y02T 10/47* (2013.01)

(58) Field of Classification Search
  USPC ............................... 123/571, 568.11, 568.21
  See application file for complete search history.

(56) References Cited

U.S. PATENT DOCUMENTS

| | | |
|---|---|---|
| 5,029,565 A | 7/1991 | Talbot |
| 5,111,790 A | 5/1992 | Grandy |
| 5,115,778 A | 5/1992 | Holroyd |
| 5,119,783 A | 6/1992 | Komurasski |
| 5,241,480 A | 8/1993 | Takaku et al. |
| 5,257,533 A | 11/1993 | Imada |
| 5,337,240 A | 8/1994 | Nakagawa et al. |
| 5,339,245 A | 8/1994 | Hirata et al. |
| 5,361,213 A | 11/1994 | Fujieda et al. |
| 5,392,642 A | 2/1995 | Tao |
| 5,400,648 A | 3/1995 | Mahr |
| 5,452,699 A | 9/1995 | Rossignol |
| 5,467,638 A | 11/1995 | Philipp |
| 5,594,649 A | 1/1997 | Cook et al. |
| 5,692,474 A * | 12/1997 | Yamauchi ............ F02D 35/023 123/406.22 |
| 5,693,936 A | 12/1997 | Komachiya et al. |
| 5,763,769 A | 6/1998 | Kluzner |
| 5,837,887 A | 11/1998 | Shibata et al. |
| 5,905,193 A | 5/1999 | Hashizume et al. |
| 5,932,801 A | 8/1999 | Akishita et al. |
| 5,934,256 A | 8/1999 | Werizlawski et al. |
| 5,996,398 A | 12/1999 | Schleupen et al. |
| 6,098,602 A * | 8/2000 | Martin ............... F02D 41/0072 123/568.23 |
| 6,104,195 A | 8/2000 | Yoshinaga et al. |
| 6,273,064 B1 | 8/2001 | Scholl et al. |
| 6,276,334 B1 | 8/2001 | Flynn et al. |
| 6,330,877 B1 | 12/2001 | Nordin |
| 6,336,355 B1 | 1/2002 | Sasaki et al. |
| 6,550,311 B2 | 4/2003 | Sloboda |
| 6,598,468 B2 | 7/2003 | Zur Loye et al. |
| 6,662,781 B1 | 12/2003 | Torno et al. |
| 6,814,054 B2 | 11/2004 | Sauler et al. |
| 6,862,517 B2 | 3/2005 | Galtier |
| 6,885,932 B2 | 4/2005 | Liu et al. |
| 6,912,460 B2 | 6/2005 | Sauler et al. |
| 6,947,829 B2 | 9/2005 | Honda |
| 6,978,771 B2 | 12/2005 | Kuzuyama et al. |
| 6,990,947 B2 | 1/2006 | Kuzuyama et al. |
| 7,021,128 B2 | 4/2006 | Rauchfuss et al. |
| 7,027,909 B2 | 4/2006 | deBotton et al. |
| 7,055,492 B2 * | 6/2006 | Yamaoka ............ B60W 10/06 123/295 |
| 7,181,338 B2 | 2/2007 | Takernura et al. |
| 7,191,658 B2 | 3/2007 | Oda et al. |
| 7,212,909 B2 | 5/2007 | Yoshino et |
| 7,243,529 B2 | 7/2007 | Takernura et al. |
| 7,246,600 B2 | 7/2007 | Nakashima et al. |
| 7,260,469 B2 | 8/2007 | Birk et al. |
| 7,263,872 B2 | 9/2007 | Danet et al. |
| 7,310,993 B2 | 12/2007 | Popielas et al. |
| 7,325,529 B2 | 2/2008 | Ancimer et al. |
| 7,356,404 B2 | 4/2008 | Takemura et al. |
| 7,376,506 B2 | 5/2008 | Schueler |
| 7,383,816 B2 | 6/2008 | Zurlo |
| 7,444,231 B2 | 10/2008 | Ancimer et al. |
| 7,444,236 B2 | 10/2008 | Wiles |
| 7,448,254 B2 | 11/2008 | Kurtz et al. |
| 7,546,198 B2 | 6/2009 | Remelman |
| 7,559,230 B2 | 7/2009 | Zimmer |
| 7,571,640 B2 | 8/2009 | Andrews |
| 7,628,253 B2 | 12/2009 | Jin et al. |
| 7,669,582 B2 | 3/2010 | Huang |
| 7,712,450 B2 | 5/2010 | Sato et al. |
| 7,747,380 B2 | 6/2010 | Chauvin et al. |
| 7,810,469 B2 | 10/2010 | Vigild et al. |
| 7,823,561 B2 | 11/2010 | Omuro et al. |
| 8,000,884 B2 | 8/2011 | Aso et al. |
| 8,032,293 B2 | 10/2011 | Binder et al. |
| 8,069,972 B2 | 12/2011 | Auclair et al. |
| 8,078,389 B2 | 12/2011 | Huang et al. |
| 8,079,261 B2 | 12/2011 | Crickmore et al. |
| 8,108,131 B2 | 1/2012 | Huang et al. |
| 8,155,857 B2 | 4/2012 | Loeffler et al. |
| 8,250,905 B2 | 4/2012 | Schneider et al. |
| 8,260,531 B2 | 9/2012 | Yasuda |
| 8,316,824 B2 | 11/2012 | Hagari et al. |
| 8,342,011 B2 | 1/2013 | Galtier et al. |
| 8,359,909 B2 | 1/2013 | Duval et al. |
| 8,396,649 B2 | 3/2013 | Huang |
| 8,463,533 B2 | 6/2013 | Glugla et al. |
| 8,499,623 B2 | 8/2013 | Duval et al. |
| 8,528,521 B2 | 9/2013 | Landsmann et al. |
| 8,538,666 B2 | 9/2013 | Buslepp et al. |
| 8,606,484 B2 | 12/2013 | Ohata |
| 8,627,800 B2 | 1/2014 | Glugla et al. |
| 8,639,432 B2 | 1/2014 | Matsuo et al. |
| 8,680,707 B2 | 3/2014 | Childs et al. |
| 8,677,975 B2 | 8/2014 | Muhammad et al. |
| 8,849,471 B2 | 9/2014 | Daniel et al. |
| 9,556,810 B2 * | 1/2017 | Bizub ................. F02D 41/0052 |
| 2004/0050363 A1 * | 3/2004 | Yamaoka ............ B60W 10/10 123/435 |
| 2010/0031924 A1 * | 2/2010 | Sun ........................ F02B 1/12 123/435 |
| 2011/0265454 A1 * | 11/2011 | Smith ................... F01N 3/0842 60/274 |
| 2012/0060497 A1 * | 3/2012 | Roth ..................... F02D 35/027 60/605.2 |
| 2012/0150414 A1 * | 6/2012 | Huang ................. F02D 35/027 701/101 |
| 2014/0000552 A1 * | 1/2014 | Glugla .................... F02D 43/00 123/295 |
| 2014/0144413 A1 * | 5/2014 | Pierik .................... F02M 26/20 123/568.12 |
| 2014/0158084 A1 * | 6/2014 | Fiveland ............... F02B 75/021 123/292 |
| 2014/0165976 A1 * | 6/2014 | Chen .................. F02D 41/0072 123/568.18 |
| 2014/0172280 A1 * | 6/2014 | Ogata .................... G01H 17/00 701/111 |
| 2014/0236456 A1 * | 8/2014 | Nakada ............... F02D 41/0072 701/103 |
| 2014/0278010 A1 * | 9/2014 | Hamama ............... F02D 35/027 701/106 |
| 2014/0366853 A1 * | 12/2014 | Ichihara ............... F02D 41/0077 123/568.11 |
| 2015/0053186 A1 * | 2/2015 | Surnilla ................. F02M 26/07 123/568.21 |
| 2015/0267630 A1 * | 9/2015 | Magnusson ........... F02D 19/105 123/568.19 |
| 2016/0108828 A1 * | 4/2016 | Glugla ................. F02D 41/0087 123/344 |
| 2016/0160776 A1 * | 6/2016 | Yeager .................. F02D 35/023 123/435 |
| 2016/0160779 A1 * | 6/2016 | Yeager .................. F02D 41/009 701/103 |
| 2016/0186679 A1 * | 6/2016 | Bizub ................. F02D 41/0052 60/274 |
| 2016/0223422 A1 * | 8/2016 | Bizub ................... F02B 77/085 |
| 2016/0230682 A1 * | 8/2016 | Hagner ............... F02D 41/0072 |
| 2016/0258380 A1 * | 9/2016 | Cygan, Jr. ............. F02D 35/023 |

(56) References Cited

U.S. PATENT DOCUMENTS

| | | | | |
|---|---|---|---|---|
| 2016/0281617 A1* | 9/2016 | Batal | ................... | F02D 35/027 |
| 2016/0305351 A1* | 10/2016 | Barta | ................... | F02D 41/14 |

FOREIGN PATENT DOCUMENTS

| | | |
|---|---|---|
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jerry Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
Reduction Piston Slap Excitation by Optimizing Piston Profiles; Takayuki Koizumi et al,; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net; May 2012.
Bolt loosening detection using vibration characteristics of thin plate with piezoelectric elements;Takeshi Nakahara et al; Proc.of SPIE 5391, Smart Struc. & Materials, Jul. 2004.

* cited by examiner

SYSTEM AND METHOD FOR DETERMINING LOCATION AND VALUE OF PEAK FIRING PRESSURE

BACKGROUND

The subject matter disclosed herein relates to knock sensors, and more specifically, to utilizing knock sensors mounted to large, multi-cylinder reciprocating devices (e.g., combustion engine, reciprocating compressors, etc.) in conjunction with standard quality control techniques to improve knock margin detection and control for adjusting the exhaust gas recirculation (EGR) rate for EGR engines.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power. Exhaust emissions from the engine generally includes pollutants, such as nitrogen oxides ($NO_x$), unburnt hydrocarbons (HC), and carbon monoxide (CO). Internal combustion engines, such as reciprocating engines, may include a variety of features to reduce these exhaust emissions. Unfortunately, some pollutant reduction techniques may cause a narrow timing range such that a cylinder in the combustion engine may experience misfire (i.e., low firing timing) or knock (i.e., high firing timing).

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a combustion engine having an intake manifold and an exhaust manifold, an exhaust gas recirculation (EGR) system coupled to the combustion engine and configured to route exhaust generated by the combustion engine from the exhaust manifold to the intake manifold, and a first knock sensor coupled to the combustion engine and configured to measure vibrations of the combustion engine and output a first vibration signal. The system also includes a controller communicatively coupled to the combustion engine, the knock sensor, the EGR system, or any combination thereof. The controller is configured to determine a peak firing pressure (PFP) within the combustion engine and control operations of both the combustion engine and the EGR system based on the PFP.

In accordance with a second embodiment, a method includes determining an exhaust gas recirculation (EGR) flow rate for a combustion engine based on operating parameters detected by sensors disposed about the combustion engine. The EGR flow rate includes a flow of exhaust generated by the combustion engine from an exhaust manifold to an intake manifold of the combustion engine. The method also includes receiving a first vibration signal from a first knock sensor coupled to a first location on the combustion engine, determining a location and a value of peak firing pressure (PFP) within a cylinder of the combustion engine based on the first vibration signal, and adjusting the exhaust gas recirculation (EGR) flow rate based on the first vibration signal.

In accordance with a third embodiment, a system includes a controller with non-transitory computer readable medium storing instructions configured to: determine an exhaust gas recirculation (EGR) flow rate for a combustion engine based on parameters detected by sensors within the combustion engine. The EGR flow rate includes a flow of exhaust generated by the combustion engine from an exhaust manifold to an intake manifold of the combustion engine. The controller is also configured to: receive a first vibration signal from a first knock sensor coupled to a first location on the combustion engine, determine a location and a value of peak firing pressure (PFP) within a cylinder of the combustion engine based on the first vibration signal, and adjust the exhaust gas recirculation (EGR) flow rate based on the PFP.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
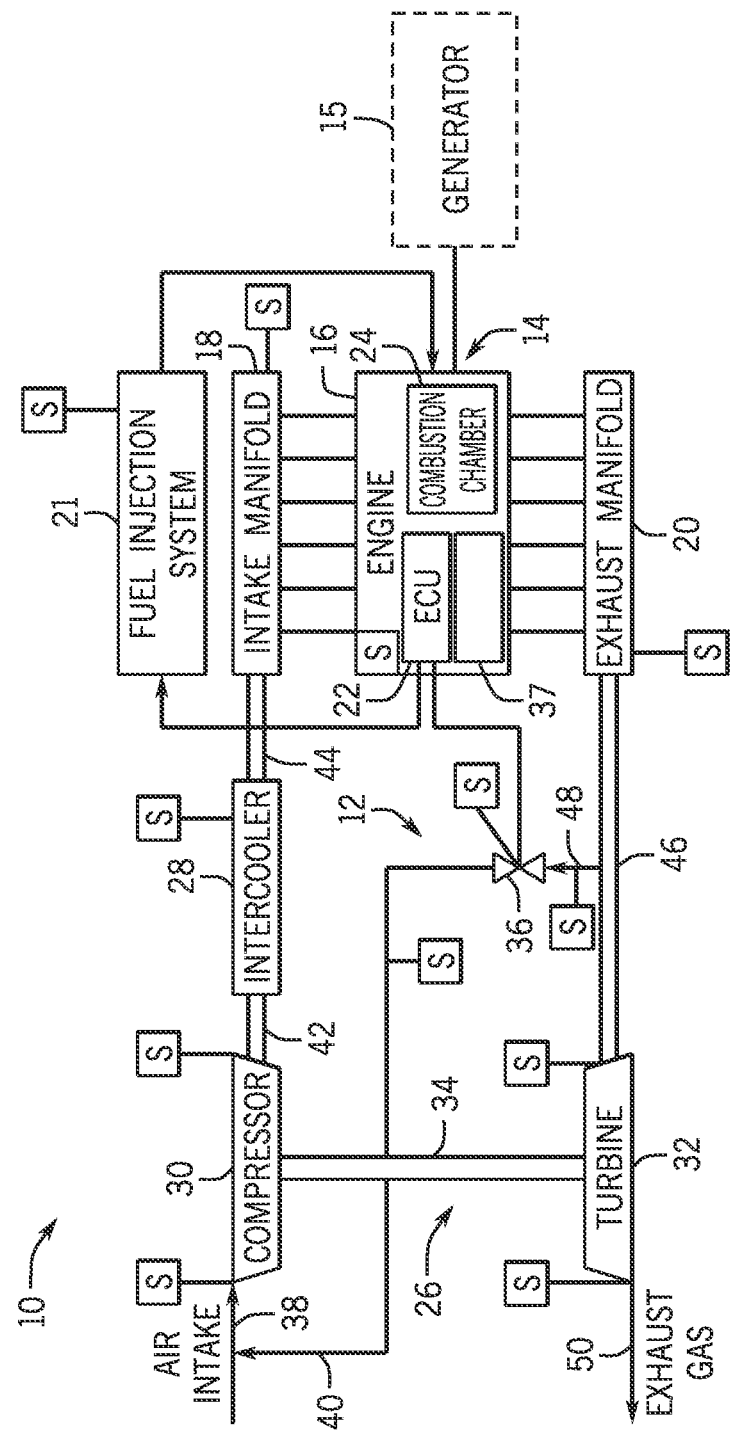
FIG. 1 is a block diagram of an embodiment of an exhaust gas recirculation (EGR) system coupled to an internal combustion system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The presently disclosed systems and methods enable the control of an exhaust gas recirculation (EGR) system utilizing one or more sensors, such as a knock sensor. In particular, embodiments of the present disclosure include an internal combustion engine (e.g., a reciprocating internal combustion engine such as a diesel, gasoline, or gas engine) that includes an intake manifold and exhaust manifold. The combustion engine is coupled to an EGR system that routes exhaust generated by the combustion engine from the exhaust manifold to the intake manifold. A controller (e.g., a processor-based controller) controls operations of both the combustion engine and the EGR system. During use, combustion engines (or other reciprocating devices such as compressors) may utilize exhaust gas recirculation (EGR) to reduce pollutants in the exhaust. These combustion engines operate at a firing timing wherein the reciprocating components of the engine complete a cycle in a given time. The firing timing may be affected by a number of conditions within the engine, as well as environmental or other conditions without the engine. Unfortunately, a high or low firing timing may result in engine conditions that are undesirable. For example, a high firing timing may result in engine knock, which can contribute to wearing in the engine and/or decrease in efficiency of the engine. On the other hand, backing off from a high firing rate can result in misfire of the engine if the firing timing is too low. Re-circulated exhaust gas in EGR engines may cause a narrow ignition timing window such that the timing at which knock occurs is close to the timing at which misfire occurs. As described in further detail below, systems and methods are provided for determining a location of peak firing pressure and/or estimated absolute pressure within cylinders of a combustion engine as a feedback mechanism to adjust EGR flow rate and improve operation of the engine.

Turning now to the drawings and referring first to FIG. 1, a block diagram of an embodiment of a system 10 that includes an exhaust gas recirculation (EGR) system 12 coupled to an internal combustion system 14. As described in detail below, the disclosed system 10 utilizes knock sensor feedback to determine a peak firing pressure (PFP) location to adjust an EGR flow rate. The EGR flow rate may be adjusted to control firing timing so that the system 10 does not suffer knock or misfire. The system 10 may include a vehicle, such as a locomotive, an automobile, a bus, or a boat. Alternatively, the system 10 may include a stationary system, such as a power generation system having the internal combustion system 14 coupled to an electrical generator 15. The system 10 may generate power ranging from 10 kW to 10 MW or greater. Besides power generation, the system 10 may be utilized in other applications such as those that recover heat and utilize the heat (e.g., combined heat and power applications), combined heat, power, and cooling applications, applications that also recover exhaust components (e.g., carbon dioxide) for further utilization, gas compression applications, and mechanical drive applications. The internal combustion system 14 includes an engine 16 (e.g., a reciprocating internal combustion engine) having an intake manifold 18, an exhaust manifold 20, fuel injection system 21, and a controller (e.g., an engine control unit (ECU 22)).

The engine 16 may include a reciprocating or piston engine (e.g., internal combustion engine). The engine 16 may include a spark-ignition engine or a compression-ignition engine. The engine 16 may include a natural gas engine, gasoline engine, diesel engine, or dual fuel engine. The engine 16 may be a two-stroke engine, three-stroke engine, four-stroke engine, five-stroke engine, or six-stroke engine. The engine 16 may also include any number of combustion chambers 12 (e.g., 1, 2, 3, 4, 5, 6, 7, 8, 10, 12, 14, 16, 18, 20, or more combustion chambers 12) and associated piston and liners. In some such cases, the cylinders and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 16 may operate at less than approximately 1800 revolutions per minute (RPM). In some embodiments, the engine 16 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 16 may operate between approximately 750-2000 RPM, 900-1800 RPM, or 1000-1600 RPM. In some embodiments, the engine 16 may operate at approximately 1800 RPM, 1500 RPM, 1200 RPM, 1000 RPM, or 900 RPM. Exemplary engines may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

As illustrated, the system 10 also includes a turbocharger 26 and an intercooler 28 (e.g., a heat exchanger). The illustrated turbocharger 26 includes a compressor 30 coupled to a turbine 32 via a drive shaft 34. The turbine 32 is driven by exhaust gas to drive the compressor 30, which in turn compresses the intake air and EGR flow for intake into the intake manifold 18 after cooling by the intercooler 28. The EGR system 12 includes an EGR valve 36 disposed downstream from the exhaust manifold 20 and upstream from the compressor 30.

The ECU 22 is coupled to various sensors and devices throughout the system 10 (including the internal combustion system 14 and the EGR system 12). For example, the illustrated controller is 22 is coupled to the EGR valve 36 and the fuel injection system 21. However, the ECU 22 may be coupled to sensors (represented by S in FIG. 1) and control features of each illustrated component of the system 10 among many others (e.g., based on operating parameters of the system 10 (e.g., internal combustion system 14 and/or the EGR system 12 derived from the sensors). The sensors may include atmospheric and engine sensors, such as pressure sensors, temperature sensors, speed sensors, and so forth. For example, the sensors may include $NO_x$ sensors, oxygen or lambda sensors, engine air intake temperature sensor, engine air intake pressure sensor, jacket water temperature sensor, EGR flow rate sensor, EGR temperature sensor, EGR inlet pressure sensor, EGR valve pressure sensor, EGR temperature sensor, EGR valve position sensor, engine exhaust temperature sensor, and engine exhaust pressure sensor. Other sensors may also include compressor inlet and outlet sensors for temperature and pressure. The ECU 22 may control other devices (e.g., the EGR valve) via one or more actuators.

The engine driven power generation system 8 may include one or more knock sensors 37 suitable for detecting engine "knock." The knock sensor 37 may sense vibrations caused by the engine, such as vibration due to detonation, pre-ignition, and or pinging. In addition, the engine driven power generation system may include other sensors S (e.g., one or more temperature transducers to detect other operating conditions (e.g., temperature (e.g., global temperature and/or temperature gradient) of a medium (e.g., cast iron) that the one or more knock sensors 37 are coupled to, humidity, temperature of the air 38, composition of the fuel, $NO_x$ sensor, etc.). The knock sensor 37 is shown communicatively coupled to an engine control unit (ECU) 25. During operations, signals (e.g., vibration signals) from the knock sensor 37 are communicated to the ECU 22 to determine if knocking (e.g., pinging) and/or misfire conditions exist. The ECU 22 may then adjust certain engine 16 parameters to ameliorate or eliminate the knocking conditions. For example, the ECU 22 may adjust the EGR flow rate by controlling an EGR valve 27. Although the following techniques are discussed in terms of a combustion engine, the same techniques may be applied to other reciprocating devices such as compressors.

In the illustrated embodiment of FIG. 1, the system 10 intakes an oxidant, such as air, oxygen, oxygen-enriched air, oxygen-reduced air, or any combination thereof into the compressor 30 as illustrated by arrow 38. The compressor 30 intakes a portion of the exhaust (e.g., EGR flow) from the exhaust manifold 20 via control of the EGR valve 36 as indicated by arrow 40. In turn, the compressor 30 compresses the intake air and the portion of the engine exhaust (e.g., EGR flow) and outputs the compressed gas to the intercooler 28 via a conduit 42. The intercooler 28 functions as a heat exchanger to remove heat from the compressed gas as a result of the compression process. The intercooler 28 may be heat exchanger (e.g., direct or indirect heat exchanger) that utilizes water, air, or another coolant. As appreciated, the compression process typically heats up the intake air and the portion of the exhaust gas, and thus is cooled prior to intake into the intake manifold 18. As depicted, the compressed and cooled air passes from the intercooler 28 to the intake manifold 18 via conduit 44.

The intake manifold 18 then routes the compressed gas into the engine 18 (e.g., into piston cylinder assemblies). Fuel from the fuel injection system 21 is injected directly into the engine cylinders 24. The ECU 22 may control the fuel injection timing of the fuel injection system 21, such that the fuel is injected at the appropriate time into the engine 16. Combustion of the fuel and air (or oxidant) generates hot combustion gases, which in turn drive the pistons (e.g., reciprocating pistons) within their respective cylinders.

In turn, the engine 16 exhausts the products of combustion from the various piston cylinder assemblies through the exhaust manifold 20. The exhaust from the engine 16 then passes through a conduit 46 from the exhaust manifold 20 to the turbine 32. In addition, a portion of the exhaust may be routed from the conduit 46 to the EGR valve 36 as illustrated by the arrow 48. At this point, a portion of the exhaust passes to the air intake of the compressor 30 as illustrated by the arrow 40 mentioned above. The ECU 22 controls the EGR valve 36, such that a suitable portion of the exhaust is passed to the compressor 30 depending on various operating parameters and/or environmental conditions of the system 10. In addition, the exhaust gas drives the turbine 32, such that the turbine 32 rotates the shaft 34 and drives the compressor 30. The exhaust gas then passes out of the system 10 and particularly the turbine 32 as indicated by arrow 50.

In some embodiments, the system 10 may not include all of the components illustrated in FIG. 1. In addition, the system 10 may include additional components such as control components, aftertreatment components, and/or heat recovery components. For example, the EGR system 12 may include components to heat and/or cool the exhaust flow through the EGR system 12. The system 10 may include more than one intercooler 18. Also, the system 10 may include a variety of valves (e.g., fuel valves, pressure valves, etc.).

Figure 2:
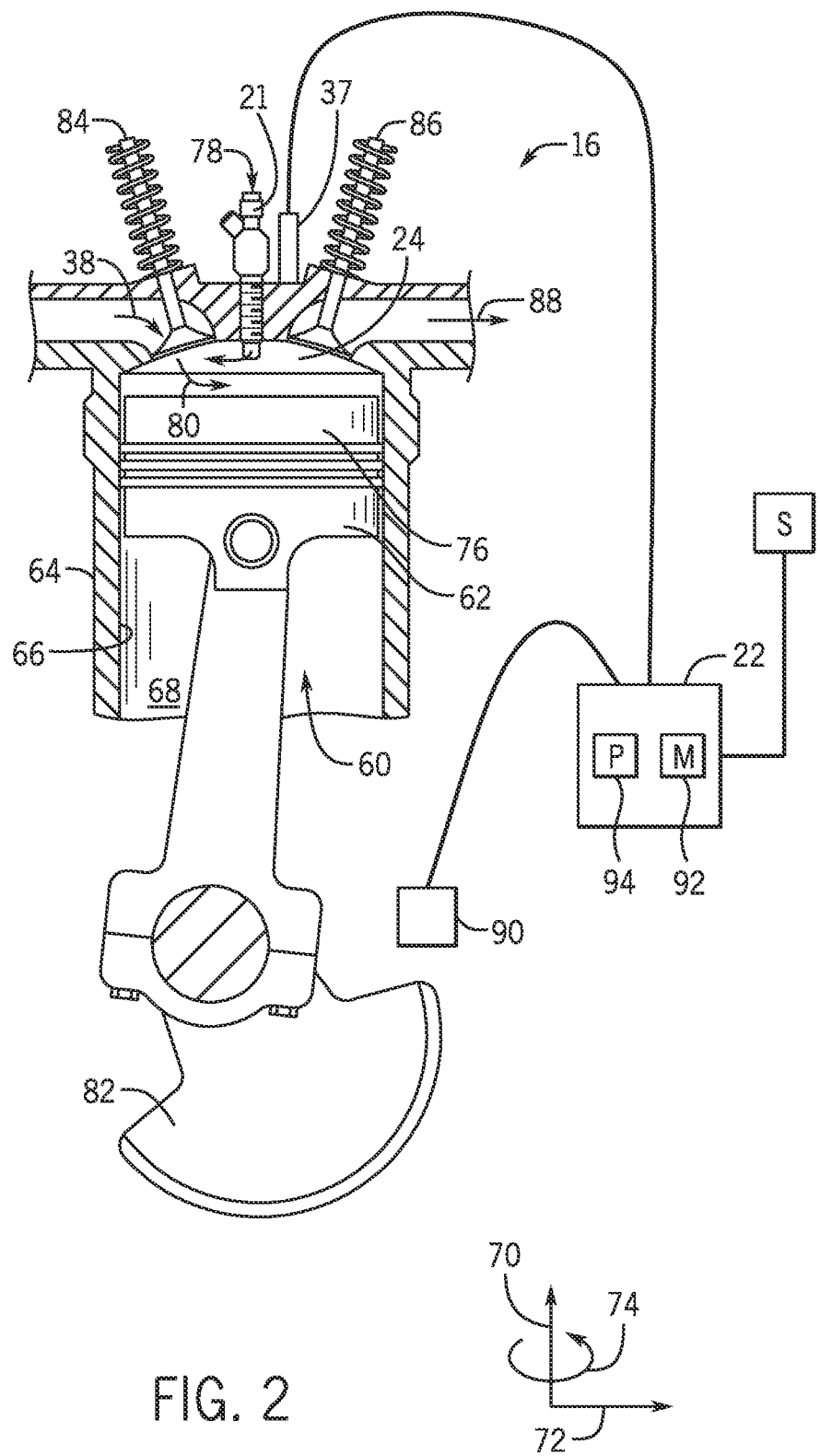
FIG. 2 is a side cross-sectional view of an embodiment of a piston assembly within a cylinder of the reciprocating engine shown in FIG. 1 in accordance with aspects of the present disclosure.

FIG. 2 is a side cross-sectional view of an embodiment of a piston assembly 60 having a piston 62 disposed within a cylinder 64 (e.g., an engine cylinder) of the reciprocating engine 16. The cylinder 64 has an inner annular wall 66 defining a cylindrical cavity 68 (e.g., bore). The piston 62 may be defined by an axial axis or direction 70, a radial axis or direction 72, and a circumferential axis or direction 74. The piston 62 includes a top portion 76 (e.g., a top land). The top portion 76 generally blocks the fuel 78 and the air 38, or an air-fuel mixture 80, from escaping from the combustion chamber 24 during reciprocating motion of the piston 62.

As shown, the piston 62 is attached to a crankshaft 82 that translates the reciprocating linear motion of the piston 62 into a rotating motion. As the piston 62 moves, the crankshaft 82 rotates to power the electrical generator 15 (shown in FIG. 1), as discussed above. As shown, the combustion chamber 24 is positioned adjacent to the top land 76 of the piston 62. The fuel injection system 21 provides fuel 78 to the combustion chamber 24, and an intake valve 84 controls the delivery of air 38 to the combustion chamber 24. An exhaust valve 86 controls discharge of exhaust 88 from the engine 16. However, it should be understood that any suitable elements and/or techniques for providing fuel 78 and air 38 to the combustion chamber 24 and/or for discharging exhaust may be utilized, and in some embodiments, no fuel injection is used. In operation, combustion of the fuel 78 with the air 38 in the combustion chamber 24 causes the piston 62 to move in a reciprocating manner (e.g., back and forth) in the axial direction 70 within the cavity 68 of the cylinder 64.

During operations, when the piston 62 is at the highest point in the cylinder 64 it is in a position called top dead center (TDC). When the piston 62 is at its lowest point in the cylinder 64, it is in a position called bottom dead center (BDC). As the piston 62 moves from top to bottom or from bottom to top, the crankshaft 82 rotates one half of a revolution. Each movement of the piston 62 from top to bottom or from bottom to top is called a stroke, and engine 16 embodiments may include two-stroke engines, three-stroke engines, four-stroke engines, five-stroke engine, six-stroke engines, or more.

During engine 16 operations, a sequence including an intake process, a compression process, a power process, and an exhaust process typically occurs. The intake process enables a combustible mixture, such as fuel and air, to be pulled into the cylinder 64, thus the intake valve 84 is open and the exhaust valve 86 is closed. The compression process compresses the combustible mixture into a smaller space, so both the intake valve 84 and the exhaust valve 86 are closed. The power process ignites the compressed air-fuel mixture, which may include a spark ignition through a spark plug system, and/or a compression ignition through compression heat. The resulting pressure from combustion then forces the piston 62 to BDC. The exhaust process typically returns the piston 62 to TDC while keeping the exhaust valve 86 open. Under certain conditions, the air-fuel mixture 80 may combust prematurely before the piston 62 returns to TDC. These conditions may be called "knock" or "pinging" and may be detected by the knock sensor 37. Other conditions may cause the air-fuel mixture 80 to combust belatedly, after the piston 62 has passed TDC. These conditions may be called "misfire." The knock or misfire may be affected by many conditions including environmental conditions, engine health, load on the engine 16, air flow, fuel flow, or composition of the fuel. It is to be noted that more than one intake valve 84 and exhaust valve 86 may be used per cylinder 64.

After combustion, the exhaust process concludes by expelling the spent air-fuel mixture (e.g., exhaust gas 88) through the exhaust valve 86. The exhaust gas 88 may include pollutants such as $NO_x$ that are produced at certain temperatures and pressures within the combustion chamber 24. The occurrence of these unwanted components may be decreased by introducing heat absorbents such as $CO_2$ or other gases from the exhaust 88. The amount of exhaust gas 88 is determined by the ECU 22 taking into account the detected conditions from the knock sensors 37 and the environmental sensors (S).

The depicted engine 16 also includes a crankshaft sensor 90, the knock sensor 37, and the ECU 22, which includes non-transitory code or instructions stored in a machine-readable medium (e.g., memory 92) and used by a processor (e.g., processor 94) to implement the techniques disclosed herein. The crankshaft sensor 66 senses the position and/or rotational speed of the crankshaft 82. Accordingly, a crank angle or crank timing information may be derived. That is, when monitoring combustion engines, a timing signature may be derived in which the vibration signal from the knock sensor 37 is expressed in terms of crankshaft 82 angle. For example, a full cycle of a four stroke engine 16 may be measured as a 720° cycle. The ECU 22 is thus able to track the timing of the combustion event within the cylinder 64 for determining specifically when knock occurs. The knock sensor 37 may be a Piezo-electric accelerometer, a micro-electromechanical system (MEMS) sensor, a Hall effect sensor, a magnetorestrictive sensor, and/or any other sensor designed to sense vibration, acceleration, sound, and/or movement. In other embodiments, sensor 23 may not be a knock sensor, but any sensor that may sense vibration, pressure, acceleration, deflection, or movement.

Because of the percussive nature of the engine 16, the knock sensor 37 may be capable of detecting signatures even when mounted on the exterior of the cylinder 64. However, the knock sensor 37 may be disposed at various locations in or about the cylinder 64. Additionally, in some embodiments, a single knock sensor 37 may be shared, for example, with one or more adjacent cylinders 26. In other embodiments, each cylinder 64 may include one or more knock sensors 37 (e.g., one or more arrays of knock sensors 37 arranged along one or more planes through the engine 16). The crankshaft sensor 66 and the knock sensor 37 are shown in electronic communication with the engine control unit (ECU) 25.

An environmental sensor is also coupled to the ECU 22. The sensor S, in certain embodiments, may include sensors within the cylinder 64 that directly detect $NO_x$ emissions from the engine 16. More generally, the sensor S may include sensors that detect conditions that may be used to estimate the $NO_x$. For example, the sensors S may detect the temperature and pressure of the air 16 at intake and/or outlet, or may measure the flow rates of the air and fuel as well as the exhaust. Furthermore, sensors S in the exhaust of the engine may measure oxygen or other resultant gases, for example, which may indicate an accurate estimation of the $NO_x$ or other nitrogen-based pollutants. To receive and process the signals from the sensors S, 37, 66, the ECU 22 includes the processor 94 and the memory 92 (e.g., a machine-readable medium). The memory 92 may store non-transitory code or computer instructions that may be executed by the processor 94. The ECU 22 monitors and controls and operation of the engine 16, for example, by adjusting combustion timing, valve 84, 86 timing, delivery of fuel and oxidant (e.g., air), and so on.

Figure 3:
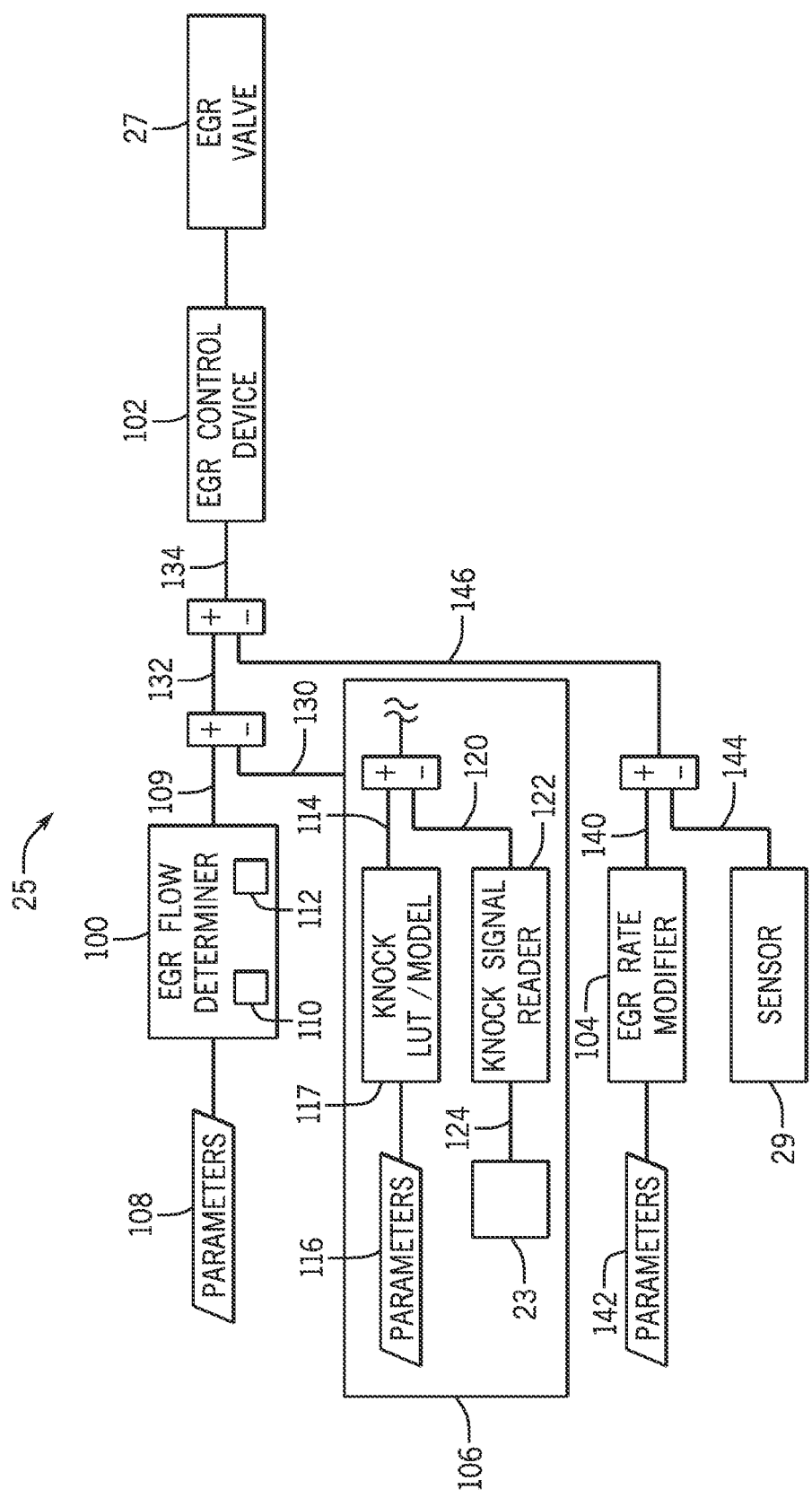
FIG. 3 is a schematic diagram of an embodiment of the functional operation of the controller to control the EGR system.

FIG. 3 is a schematic diagram of an embodiment of the functional operation of the ECU 22 to control the engine 16 and the EGR system 11. As depicted in FIG. 3, the ECU 22 includes an EGR flow rate setpoint determiner 100, an EGR control device 102, an EGR $NO_x$ flow rate modifier 104, an EGR knock flow rate modifier 106 and the EGR valve 27. In certain embodiments, the EGR control device 102, the EGR $NO_x$ flow rate modifier 104, and the EGR knock flow rate modifier 106 may be separate from the ECU 22. The EGR flow rate setpoint determiner 100, the EGR $NO_x$ flow rate modifier 104, the EGR knock flow rate modifier 106, and the EGR control device 102 may be software-based, hardware-based, or a combination of both.

The EGR flow rate setpoint determiner 100 sets a desired EGR flow rate setpoint. The EGR flow rate setpoint determiner 100 may determine an initial desired EGR flow rate setpoint based on one or more operating parameters 108 received from the sensors disposed throughout the system 10 and/or other input (e.g., user input, scheduled parameter, etc.). These operating parameters 108 may include engine speed, load, intake manifold air temperature, EGR temperature, jacket water temperature, fuel characteristics (e.g., lower heating value and/or Waukesha knock index), and/or additional parameters. Speed-density and/or $O_2$ (e.g., lambda) sensors may be utilized by the ECU 22 to determine the load by measuring EGR flow or fuel flow. In certain embodiments, the EGR flow rate determiner 100 may determine the initial desired EGR flow rate setpoint 109 (e.g., based on the received operating parameters and/or input) based on an internally-stored EGR flow rate setpoint model 110 (e.g., software-based model executable by a processor). Alternatively or in conjunction with the model 110, one or more look-up tables (LUT) 112 stored in memory may be utilized (with the received operating parameters and/or input) to determine the initial desired EGR flow rate setpoint 109.

The EGR knock flow rate modifier 106 modifies the initial (or any subsequent) EGR flow rate setpoint 109 generated by the EGR flow rate set point determiner 100. The EGR knock flow rate modifier 106 generates an initial desired setpoint (represented by arrow 114) based on one or more operating parameters 116 received from the sensors S disposed throughout the system and/or other input. These operating parameters 116 may include engine speed, load, intake manifold air temperature, EGR temperature, jacket water temperature, fuel characteristics (e.g., lower heating value and/or Waukesha knock index), and/or additional parameters. The parameters 116 utilized by the EGR knock flow rate modifier 106 may be the same and/or different from the parameters 108 utilized by the EGR flow rate determiner 100. In certain embodiments, an initial knock setpoint determiner 117 may utilize a model (e.g., software-based model executable by a processor), alternatively or in conjunction with one or more look-up tables (LUT), to determine the initial setpoint 114 (e.g., based on the received operating parameters and/or input).

The initial setpoint 114 may be adjusted based on an adjusted signal 120 from a knock signal reader 122. The knock signal reader 122 receives a signal 124 (e.g., vibration signal) from the knock sensor 37. The knock signal reader 122 determines in-cylinder pressure and/or a peak firing pressure (PFP) in relation to the crankangle. The PFP may be determined for each individual cylinder 64 in the engine 16. Furthermore, the knock signal reader 122 may continuously monitor the signal 124 to determine the location of PFP or estimate the in-cylinder pressure from each cylinder 64 on a cycle to cycle basis. The location of the PFP may thus be mapped to firing timing and, by extension, the knock or misfire of combustion in a particular cylinder may be determined.

In certain embodiments, EGR knock flow rate modifier 106 may adjust the initial setpoint 114 to determine an adjusted setpoint 130, which is combined with the EGR flow rate setpoint 109 to send to the EGR control device 102. The adjusted setpoint 130 may be based on a feed forward mapped position. That is, for a given PFP, the model or LUT within the EGR knock flow rate modifier 106 will give a value for the adjusted setpoint 130. Additionally or alternatively, the EGR knock flow rate modifier 106 may control the adjusted setpoint 130 so that the engine 16 is continuously firing between knock and misfire. To do so, the EGR knock flow rate modifier 106 may monitor each cycle of the engine 16 or cylinder 64 to determine if there is knock or misfire in that particular location. This may be done using the PFP location and value. If the EGR knock flow rate modifier 106 determines a knock or misfire condition, the adjusted setpoint 130 is corrected until a knock or misfire condition is no longer detected. The EGR knock flow rate modifier 106 may also determine boundaries for knock and misfire and maintain the adjusted setpoint 130 based on the signal 120 so that firing occurs within those boundaries.

Additionally or alternatively, the EGR knock flow rate modifier 106 may provide some diagnostic capabilities to the ECU 22. The EGR knock flow rate modifier 106 may use the knock setpoint determiner 117 to provide as the initial setpoint 114 an expected minimum and/or maximum value for the PFP. For example, based on the parameters 116 the knock setpoint determiner 117 may expect that PFP occurs within a certain range. The EGR knock flow rate modifier 106 may then determine an actual value for the PFP (e.g., adjusted signal 120) and compare it to the expected range. If the actual PFP is outside of the expected range, the EGR knock flow rate modifier 106 may output a nominal adjusted setpoint 130 to modify the firing conditions within the cylinder 64. The ECU 22 may also determine whether there is a leak in the exhaust based on the difference between an expected rate of change in the PFP and the adjustment to the EGR valve 27. Similarly, a faulty EGR valve 27 may be diagnosed when the change in PFP is less than an expected amount. The adjusted setpoint 130 may be combined with or applied to the EGR flow rate setpoint 109 to achieve a knock-adjusted setpoint 132. The EGR flow rate modifier may further utilize the difference in the adjusted setpoint 130 to adjust the knock-adjusted setpoint 132 to generate a feed forward EGR flow rate and/or trim of the EGR valve 27. Thus, knock sensor output may be utilized as the primary control signal for EGR flow rate (e.g., to control the knock-adjusted setpoint 132 to a mapped $NO_x$ emission rate).

The EGR $NO_x$ flow rate modifier 104 modifies the knock-adjusted setpoint 132 to achieve a final flow rate setpoint. The EGR $NO_x$ flow rate modifier 104 generates an initial desired $N_{ox}$ setpoint 140 based on one or more operating parameters 142 received from the sensors S disposed throughout the system and/or other input. These operating parameters 142 may be the same and/or different from the parameters 116/108 utilized by the EGR flow determiner 100 and the EGR knock flow rate modifier 106. In certain embodiments, a $NO_x$ setpoint model (e.g., software-based model executable by a processor) and or LUT may be utilized by the EGR $NO_x$ flow rate modifier 104 to determine the initial $NO_x$ setpoint 140 (e.g., based on the received operating parameters and/or input). The EGR $NO_x$ flow rate modifier 104 utilizes a measurement of $NO_x$ concentration 144 in the exhaust (e.g., received from one or more $NO_x$ and/or environmental sensors S) to determine a difference 146 (e.g., error), between the desired $NO_x$ setpoint 140 and the measured $NO_x$ concentration 144. The EGR $NO_x$ flow rate modifier 104 may further utilize the difference in $NO_x$ to adjust the knock-adjusted setpoint 132.

Figure 4:
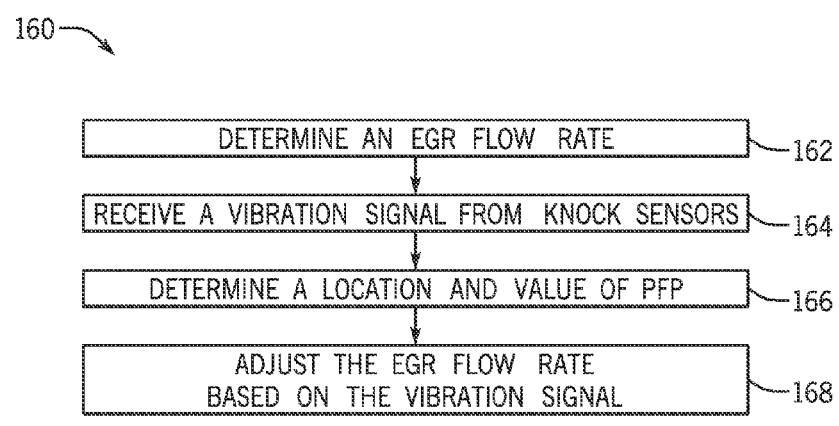
FIG. 4 is a flow chart of an embodiment of a computer-implemented method for controlling EGR flow rate.

FIG. 4 is a flow chart of an embodiment of a computer-implemented method 160 for controlling EGR flow rate. All or some of the steps of the method 160 may be executed by the ECU 22 (e.g., utilizing the processor 94 to execute programs and access data stored on the memory 92). The method includes determining an EGR flow rate (block 162) for a combustion engine 16 based on operating parameters 108 detected by sensors S disposed about the combustion engine 16. As described above, these operating parameters 108 may include engine speed, load, intake manifold air temperature, EGR temperature, jacket water temperature, fuel characteristics (e.g., lower heating value and/or Waukesha knock index), and/or additional parameters. The EGR flow rate includes at least some of the exhaust 88 generated by the combustion engine 16. The exhaust 88 is recirculated from the exhaust manifold 20 to the intake manifold 18 of the combustion engine 16 to reduce the ignition temperature and $NO_x$ generation, among other things.

The method 160 also involves receiving the vibration signal 124 from some or all of the knock sensors 37 (block 164) disposed about the engine 16. As described above, the knock sensors 37 may be located or disposed in a number of locations about the engine 16. The method 160 (additionally or alternatively) includes determining a location and a value of PFP (block 166) within the cylinder 64 of the combustion engine 16 based on the vibration signal. The location of the PFP may be determined relative to the crankangle as measured by the crankshaft sensor 90, as described above. The value of the PFP for any given cylinder 64 may be stored within the ECU 22 as a model or a look-up table. The method 160 also includes adjusting the EGR flow rate (block 168) based on the vibration signal from the knock sensor 37. The vibration signal may, for example, indicate knock, misfire, or other condition within the cylinder 64. The EGR flow rate may thus be adjusted to compensate for the vibration signal.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. A system, comprising:
a combustion engine comprising an intake manifold and an exhaust manifold;
an exhaust gas recirculation (EGR) system coupled to the combustion engine and configured to route exhaust generated by the combustion engine from the exhaust manifold to the intake manifold;
a first knock sensor coupled to the combustion engine and configured to measure vibrations of the combustion engine and output a first vibration signal;

additional sensors disposed about the combustion engine; and a controller communicatively coupled to the combustion engine, the knock sensor, the EGR system, wherein the controller is configured to determine a desired EGR flow rate setpoint for the combustion engine based on operating parameters detected by the additional sensors, to determine a peak firing pressure (PFP) within the combustion engine based on the first vibration signal, to utilize the PFP to adjust the desired EGR flow rate to generate a feed forward EGR flow rate, and to control an EGR flow rate to a mapped nitrogen oxides ($NO_x$) emission rate based on the feed forward EGR flow rate.

2. The system of claim 1, comprising a second knock sensor coupled to the combustion engine configured to measure the vibrations of the combustion engine and output a second vibration signal.

3. The system of claim 2, wherein the first knock sensor is coupled proximate to a first cylinder of the combustion engine, and the second knock sensor is coupled proximate to a second cylinder of the combustion engine.

4. The system of claim 1, wherein the EGR system comprises an EGR valve, and the controller is configured to adjust a position of the EGR valve.

5. The system of claim 1, comprising a comprising a crankshaft sensor configured to send a signal indicative of crankangle to the controller for determining accurate firing timing for the combustion engine.

6. A method, comprising:
determining, via a controller, a desired exhaust gas recirculation (EGR) flow rate setpoint for a combustion engine based on operating parameters detected by sensors disposed about the combustion engine, wherein the desired EGR flow rate setpoint affects a flow of exhaust generated by the combustion engine from an exhaust manifold to an intake manifold of the combustion engine;
receiving, via the controller, a first vibration signal from a first knock sensor coupled to a first location on the combustion engine;
determining, via the controller, a peak firing pressure (PFP) within the combustion engine based on the first vibration signal;
utilizing the PFP to adjust the desired EGR flow rate to generate a feed forward EGR flow rate; and
controlling, via the controller, an EGR flow rate to a mapped nitrogen oxides ($NO_x$) emission rate based on the feed forward EGR flow rate.

7. The method of claim 6, comprising receiving a crankangle signal from a crankshaft sensor, and determining the PFP within a first cylinder of the combustion engine based on the crankangle signal and the first vibration signal.

8. The method of claim 6, comprising receiving a second vibration signal from a second knock sensor coupled to a second location on the combustion engine, wherein the first location comprises a first cylinder of the combustion engine, and the second location comprises a second cylinder of the combustion engine.

9. The method of claim 6, comprising:
receiving a second vibration signal from a second knock sensor coupled to a second location on the combustion engine; and
determining a PFP within a second cylinder of the combustion engine based on the second vibration signal.

10. The method of claim 6, comprising comparing the PFP to a minimum expected PFP and a maximum expected PFP, and if the PFP is determined to be lower than the minimum expected PFP or higher than the maximum expected PFP, adjusting the EGR flow rate to so that the PFP is between the minimum expected PFP and the maximum expected PFP.

11. The method of claim 6, comprising determining a leak in the flow of exhaust, a faulty EGR valve, or any combination thereof based on an adjusted EGR flow rate and an expected EGR flow rate.

12. The method of claim 6, wherein determining the desired EGR flow rate setpoint comprises utilizing a lookup table to determine the desired EGR flow rate setpoint.

13. The method of claim 6, wherein determining the desired EGR flow rate setpoint comprises modeling the desired EGR setpoint based on the operating parameters.

14. The method of claim 6, wherein the operating parameters comprise a combustion engine speed, a load, an intake manifold air temperature, an EGR temperature, a jacket water temperature, a characteristic of a fuel, or any combination thereof.

15. A controller comprising non-transitory computer readable medium storing instructions configured to:
determine a desired exhaust gas recirculation (EGR) flow rate for a combustion engine based on parameters detected by sensors within the combustion engine, wherein the desired EGR flow rate setpoint affects a flow of exhaust generated by the combustion engine from an exhaust manifold to an intake manifold of the combustion engine;
receive a first vibration signal from a first knock sensor coupled to a first location on the combustion engine;
determine a peak firing pressure (PFP) within the combustion engine based on the first vibration signal;
utilize the PFP to adjust the desired EGR flow rate to generate a feed forward EGR flow rate; and
control an EGR flow rate to a mapped nitrogen oxides (NOx) emission rate based on the feed forward EGR flow rate.

16. The controller of claim 15, wherein the controller is configured to determine a leak in the flow of exhaust, a faulty EGR valve, or any combination thereof.

17. The controller of claim 15, wherein the parameters comprise a combustion engine speed, a load, an intake manifold air temperature, an EGR temperature, a jacket water temperature, a characteristic of a fuel, or any combination thereof.

* * * * *